(12) United States Patent
DeLong et al.

(10) Patent No.: US 7,228,924 B2
(45) Date of Patent: Jun. 12, 2007

(54) SINGLE LOCKING COLLAR AND SPROCKET HUB APPARATUS AND METHOD

(76) Inventors: Jonathan DeLong, 648 Chestnut St., Bridgeville, PA (US) 15017; Jesse A. Exler, 648 Chestnut St., Bridgeville, PA (US) 15017

( * ) Notice: Subject to any disclaimer, the term of this patent is extended or adjusted under 35 U.S.C. 154(b) by 24 days.

(21) Appl. No.: 11/169,544

(22) Filed: Jun. 29, 2005

(65) Prior Publication Data
US 2006/0037791 A1 Feb. 23, 2006

Related U.S. Application Data

(60) Provisional application No. 60/584,177, filed on Jun. 30, 2004.

(51) Int. Cl.
*B60K 7/00* (2006.01)
*F16D 23/00* (2006.01)
(52) U.S. Cl. .............................. 180/56; 180/57; 192/64
(58) Field of Classification Search ................ 280/240, 280/243; 180/56, 350, 57; 192/64, 34, 46, 192/94, 107 R; 474/95, 96; 482/119, 57, 482/63
See application file for complete search history.

(56) References Cited

U.S. PATENT DOCUMENTS

| 656,549 | A | * | 8/1900 | Kennedy | 192/46 |
|---|---|---|---|---|---|
| 3,709,341 | A | * | 1/1973 | Schulz | 192/64 |
| 4,254,852 | A | * | 3/1981 | Orozco | 192/46 |
| 4,593,799 | A | * | 6/1986 | Ozaki | 192/46 |
| 4,711,452 | A | * | 12/1987 | Dickinson et al. | 192/107 R |
| 5,433,306 | A | * | 7/1995 | Yang | 192/64 |
| 5,662,185 | A | * | 9/1997 | Mackiewicz | 180/56 |
| 6,074,316 | A | * | 6/2000 | Murrietta, Sr. | 474/96 |
| 6,641,507 | B1 | * | 11/2003 | Warner et al. | 482/63 |
| 6,675,926 | B2 | * | 1/2004 | Montague | 180/350 |

OTHER PUBLICATIONS

Rear Axle, Sprocket Holder and Sprockets; printed May 24, 2004; from http://www.klondyke.net/lar456/GoKartRearAxle.html; four pages.
First Kart Sprockets & Hub Carriers; printed May 24, 2004; from http://www.firstkart.com/products/sprockets.htm; 1 page.
Hotlaps-Sprocket Hub; printed May 24, 2004; from http://www.hotlaps.us/sprockethub.htm.

* cited by examiner

*Primary Examiner*—Hau Phan
(74) *Attorney, Agent, or Firm*—McKay & Associates, P.C.

(57) ABSTRACT

An apparatus and assembly method including a sprocket hub and a locking collar for go kart vehicles and other land vehicles with drive axles is provided. The present invention eliminates the need for two locking collars on either side of the sprocket hub. The invention further provides a light-weight sprocket hub with a hub neck portion adapted to receive a single locking collar. The sprocket hub fits loosely on the drive axle. The fin-like sprocket hub arms and sprocket hub extensions each have sprocket connection holes used to connect the sprocket hub to a drive sprocket. The locking collar engages the sprocket hub neck portion by means of two flanges located on the sprocket hub. As assembled, the sprocket hub and locking collar float and oscillate on the drive axle to compensate for chassis flex and chain bind such that acceleration of said kart vehicle is enhanced.

16 Claims, 9 Drawing Sheets

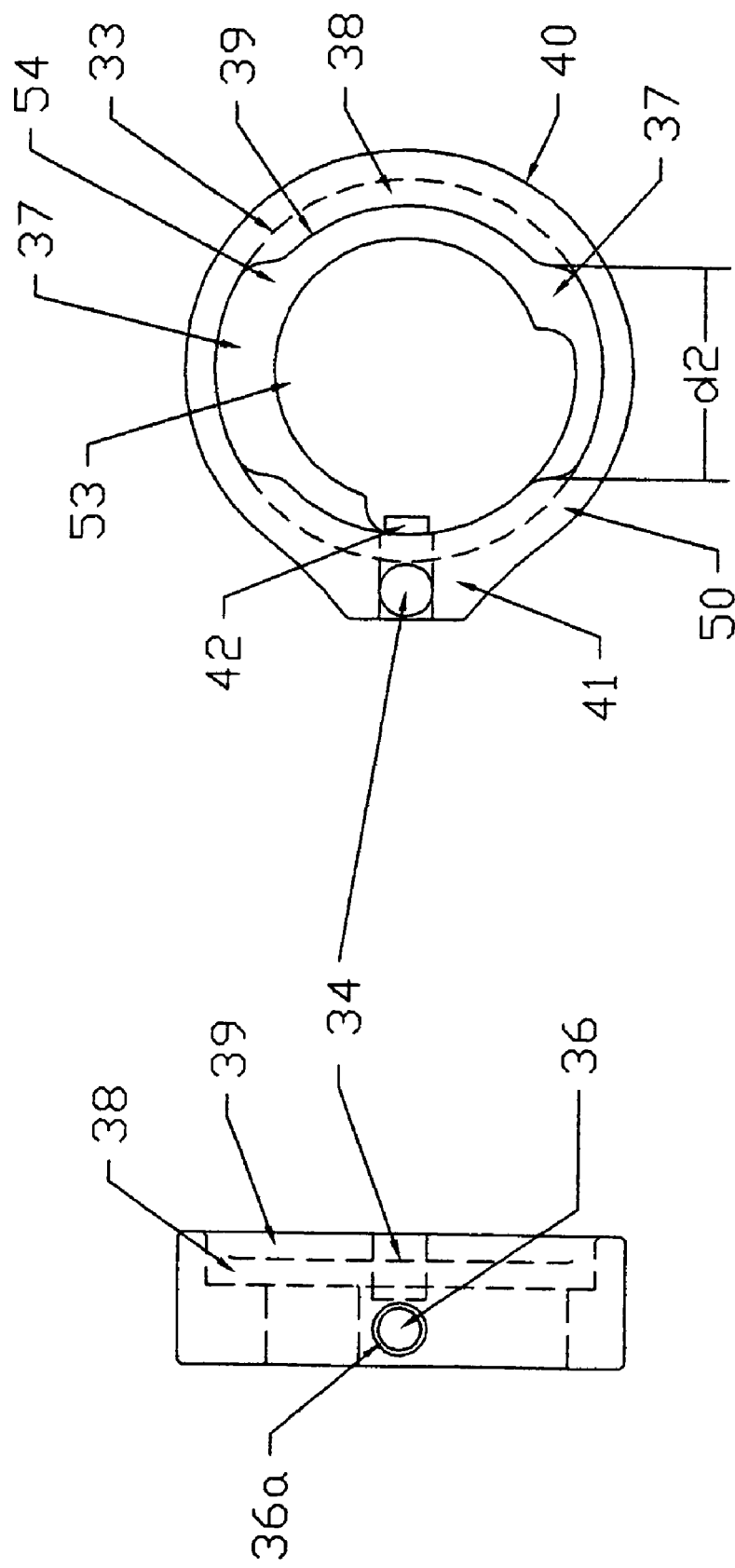

SINGLE LOCKING COLLAR AND SPROCKET HUB APPARATUS AND METHOD

PRIORITY

This application hereby claims priority to provisional application No. 60/584,177, filed on Jun. 30, 2004.

BACKGROUND

The present invention relates generally to a collar and sprocket hub apparatus and particularly relates to a single locking collar and sprocket hub apparatus and method for use on the driving axles of land vehicles. The invention can be used on a variety of vehicles, but is designed specifically for use on go kart vehicles or the like.

SUMMARY OF THE INVENTION

The object of the present invention is to provide a sprocket hub and locking collar which is lighter than the prior art sprocket hubs and collar assemblies.

Another object of the present invention is to provide a sprocket hub and locking collar that is more durable and stronger than conventional sprocket hubs with locking collars.

Yet another object of the present invention is to provide a sprocket hub and locking collar having a float and oscillating design to compensate for chassis flex and chain bind.

Yet another object of the present invention is to provide for the need of only one locking collar to further reduce the rotating weight as compared to the prior art two-collar systems.

Yet another object of the present invention is to provide a sprocket hub that has an increased life through the float and oscillating design.

Yet another object of the present invention is to provide a sprocket hub that increases the wear of the drive chain and the gear sprocket through the float and oscillating design.

Yet another object of the present invention is to provide a lightweight sprocket hub that can attach to a gear sprocket.

Accordingly, what is provided is a sprocket hub having a hub front face, a hub rear face and a plurality of fin-like hub arms. The fin-like hub arms are attached to the outer perimeter of a neck portion which extends in a direction perpendicular to a longitudinal axis of an inner perimeter of the neck portion, wherein the fin-like hub arms have recesses defined therein. A hub arm extension is attached to each of the fin-like hub arms, wherein each of the hub arm extensions has a small recess defined therein. A circular neck portion extends outwardly from the hub front face. The circular hub neck portion includes a neck top flange and a neck bottom flange both located on the end of the neck portion distal to the hub front face. These two flanges are used for attachment to the locking collar. The locking collar has an outer, middle and inner perimeter, and houses a compression screw hole 36 and compression screw 36a for fastening the collar to a bar adapted to situate in a groove on the driving axle, thus locking the collar onto the axle and sprocket hub. Particularly, a flange groove is defined between the middle perimeter lips and the intermediate surface of the locking collar. This flange groove is spaced such that the neck top flange and the neck bottom flange can fit within the flange groove during attachment of the locking collar to the sprocket hub.

Also provided is a method of situating a sprocket on a drive axle comprising the steps of sliding a sprocket hub having a bar slot over a drive axle and sliding a locking collar over the drive axle. The locking collar is attached to the drive axle. Next, the sprocket hub is loosely secured to the drive axle and a gear sprocket is attached to the sprocket hub. The next step involves attaching a drive chain to the gear sprocket and allowing the sprocket hub and the locking collar to float and oscillate on the drive axle to compensate for chassis flex and chain bind. The acceleration of the go kart vehicle is enhanced as a result of this configuration. The configuration also increases the life of the sprocket hub, gear sprocket and drive chain.

BRIEF DESCRIPTION OF THE DRAWINGS

FIG. 5 illustrates a top view of the locking collar of the present invention.

FIG. 6 illustrates a rear view of the locking collar of the present invention.

DETAILED DESCRIPTION OF THE PREFERRED EMBODIMENT

Figure 2:
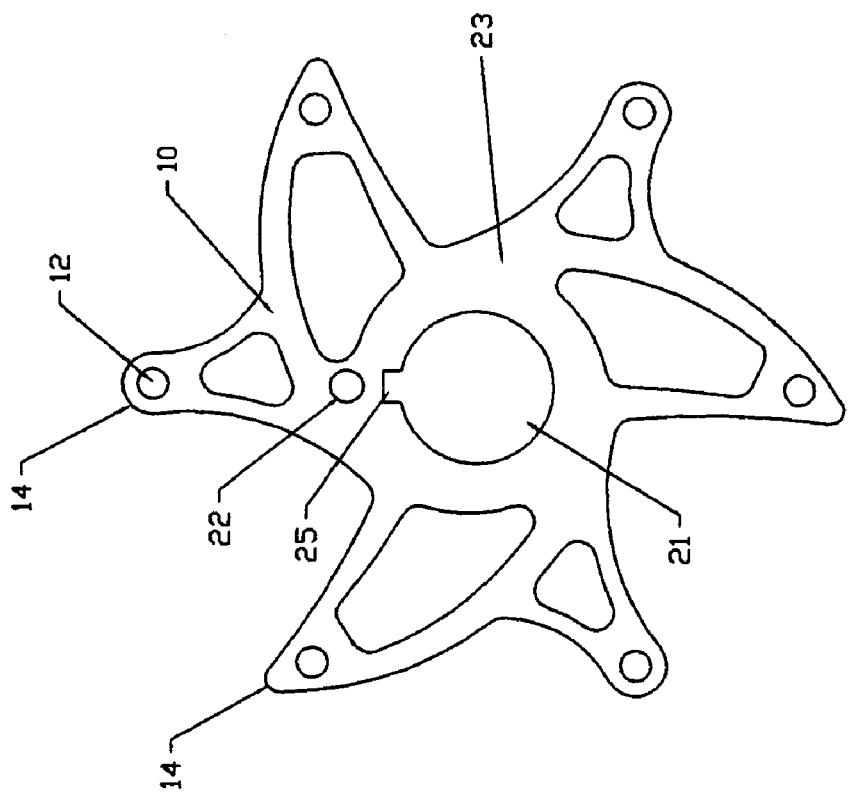
FIG. 2 illustrates a rear view of the sprocket hub of the present invention.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated apparatus and method, and such further applications of the principles of the invention illustrated herein, as would normally occur to persons skilled in the art to which the invention relates.

The present invention can be described generally as a sprocket hub 10 and a locking collar 30 each with an axle opening (21 and 53 respectively) for accepting the driving axle 90 of a go kart vehicle or other land vehicle. The sprocket hub 10 further has a bar slot 25 defined on the outer perimeter of the axle opening 21. The driving axle 90 includes an axle groove 91 defined therein (see FIGS. 8-12). Within the axle groove 91, an axle groove bar 92 is capable of being placed, such that the bar 92 fits into the bar slot 25 causing the sprocket hub 10 to rotate in unison with the driving axle 90. The bar 92 fits loosely into the bar slot 25 to enable the float and oscillating device of the present invention. The bar slot 25 can be seen in FIGS. 1, 2, 10 and 11.

As illustrated then with reference to FIGS. 1-12, FIG. 1 shows a front view of the sprocket hub 10 of the present invention. The sprocket hub 10 has three large fin-like hub arms 14 and three smaller, generally triangular hub arm extensions 14. The hub arm extensions 14 are attached to the fin-like hub arms 14. The fin-like hub arms 14 have recesses defined therein to reduce the overall weight of the sprocket hub 10. Also, the hub arm extensions 14 have small recesses defined therein to reduce the overall weight of the sprocket hub 10. A recess within the scope of this invention is defined herein as a hole or completely hollowed-out portion and not merely an indentation.

Each of these fin-like hub arms 14 and hub arm extensions 14 include sprocket connection holes 12 defined therethrough located proximate to the end of the fin-like hub arms 14 and hub arm extensions 14 opposite from the axle opening 21. The gear sprocket connection holes 12 are used to attach a gear sprocket to the sprocket hub 10 using a bolt, stud or the like. The sprocket is then connected to a drive chain.

The hub arms 14 can be of any geometry as long as the sprocket connection holes 12 generally form the perimeter, of a circle, wherein each is a uniform distance away from the outer perimeter of the axle opening 21. The hub arms 14 optionally can be replaced with a circular disk or other geometrical figure as long as the sprocket hub 10 includes sprocket connection holes 12 defined therethrough, which form generally a perimeter of a circle-like shape and each is a uniform distance away from the outer perimeter of the axle opening 21.

An optional screw hole 22 is defined through the sprocket hub 10 and is positioned proximate to the bar slot 25 in a direction opposite from the axle opening 21. The screw hole 22 provides a means whereby a stabilizing screw can be inserted through the hub rear face 23, travel through the width of the sprocket hub 10, and connect to the collar bore 34 of the locking collar 30. This optional stabilizing screw provides greater stability to the sprocket hub 10, the locking collar 30 and the assembly as a whole. If the optional stabilizing screw is included the invention will not provide as much float and oscillation to compensate for chassis flex and chain bind.

Figure 1:
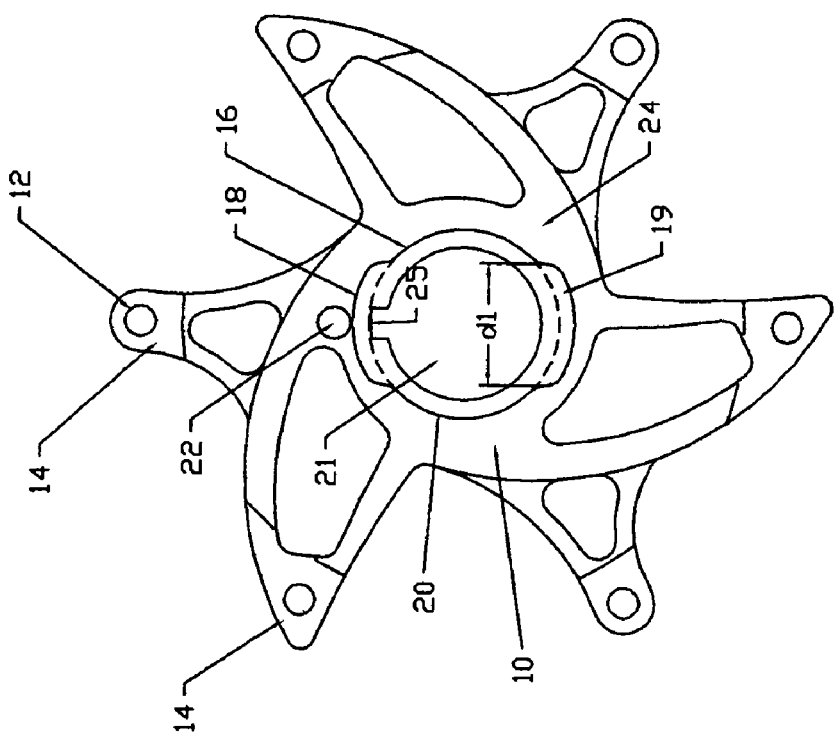
FIG. 1 illustrates a front view of the sprocket hub showing the hub neck portion and hub arms of the present invention.
Figure 4:
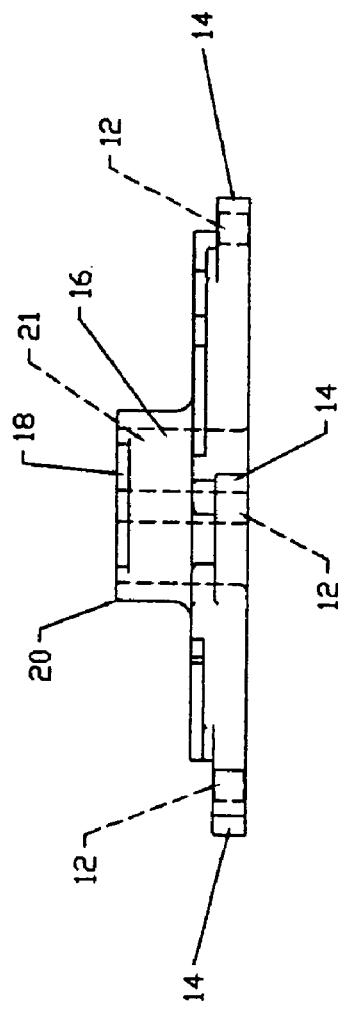
FIG. 4 illustrates a top view of the sprocket hub of the present invention.
Figure 3:
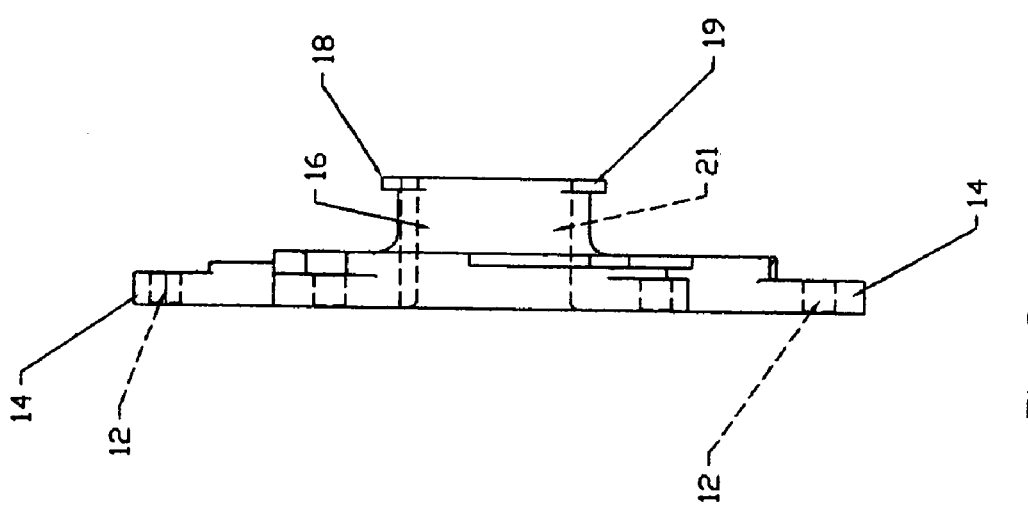
FIG. 3 illustrates a side view of the sprocket hub of the present invention.
Figure 7:
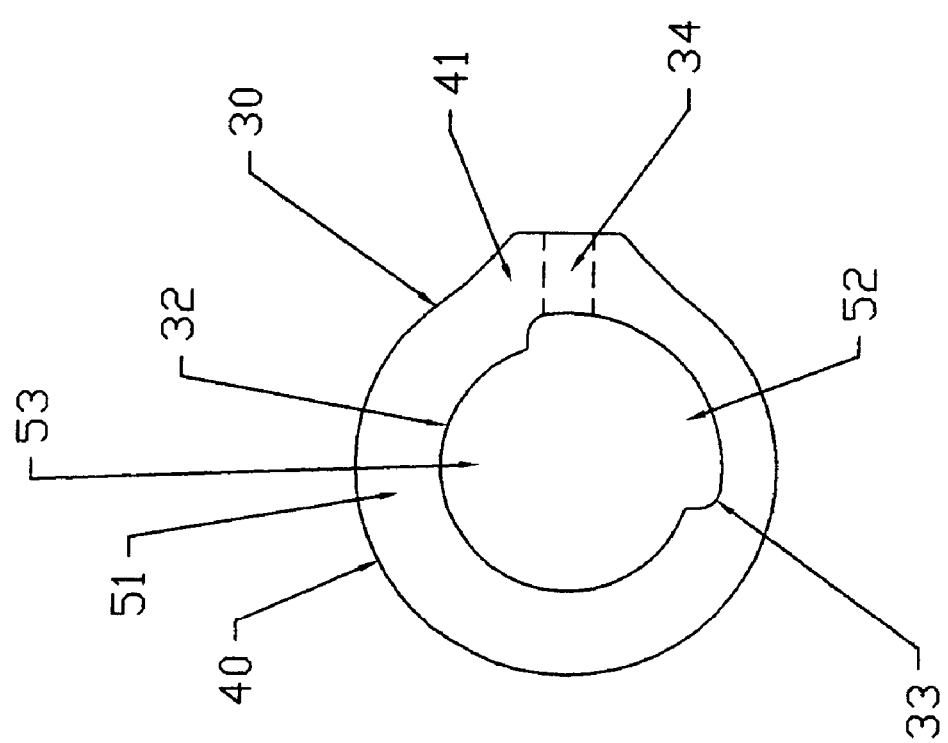
FIG. 7 illustrates a front view of the locking collar of the present invention.
Figure 10:
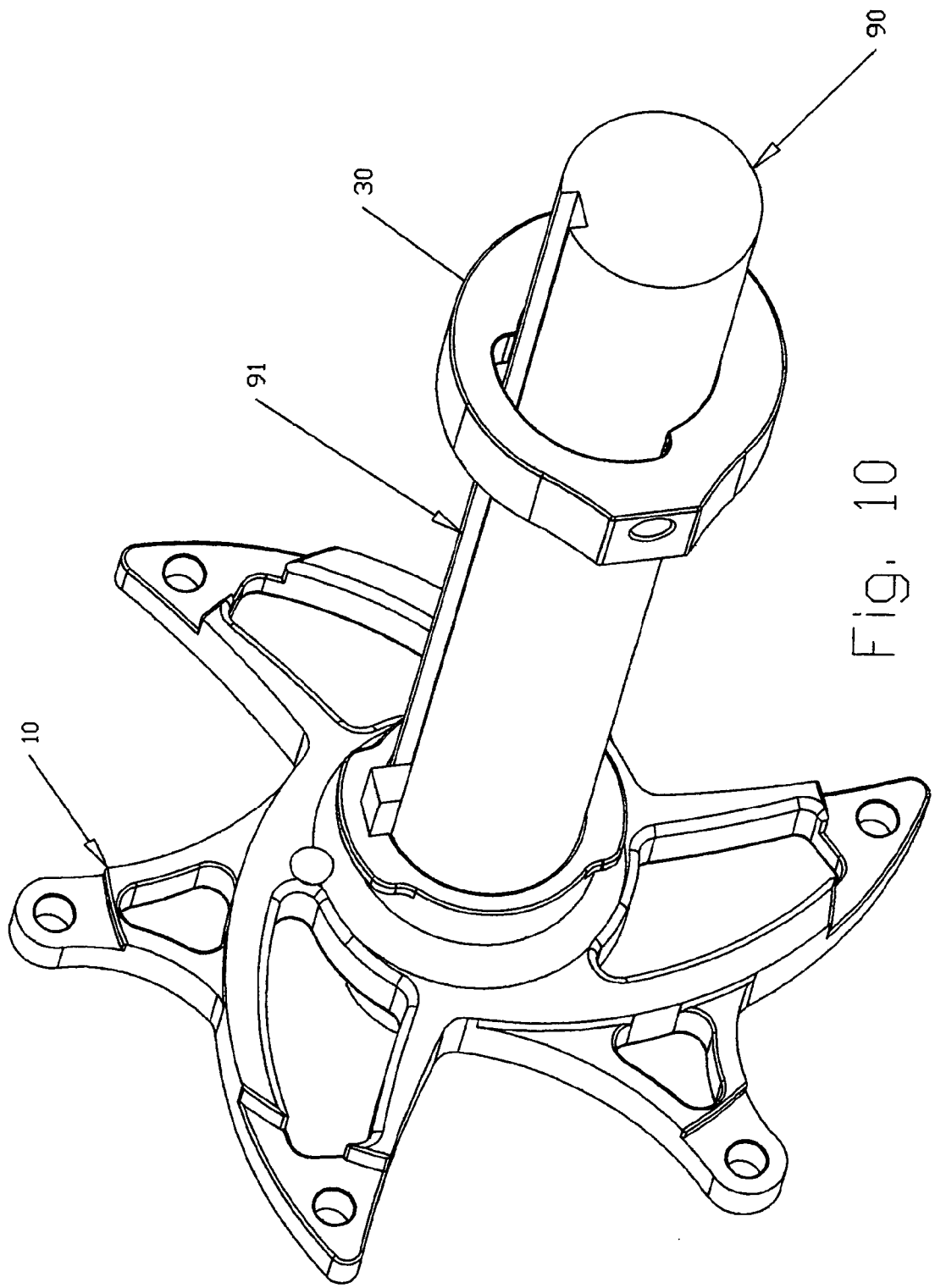
FIG. 10 illustrates a perspective view of the sprocket hub and locking collar, situated on the driving axle in a spaced apart position.
Figure 11:
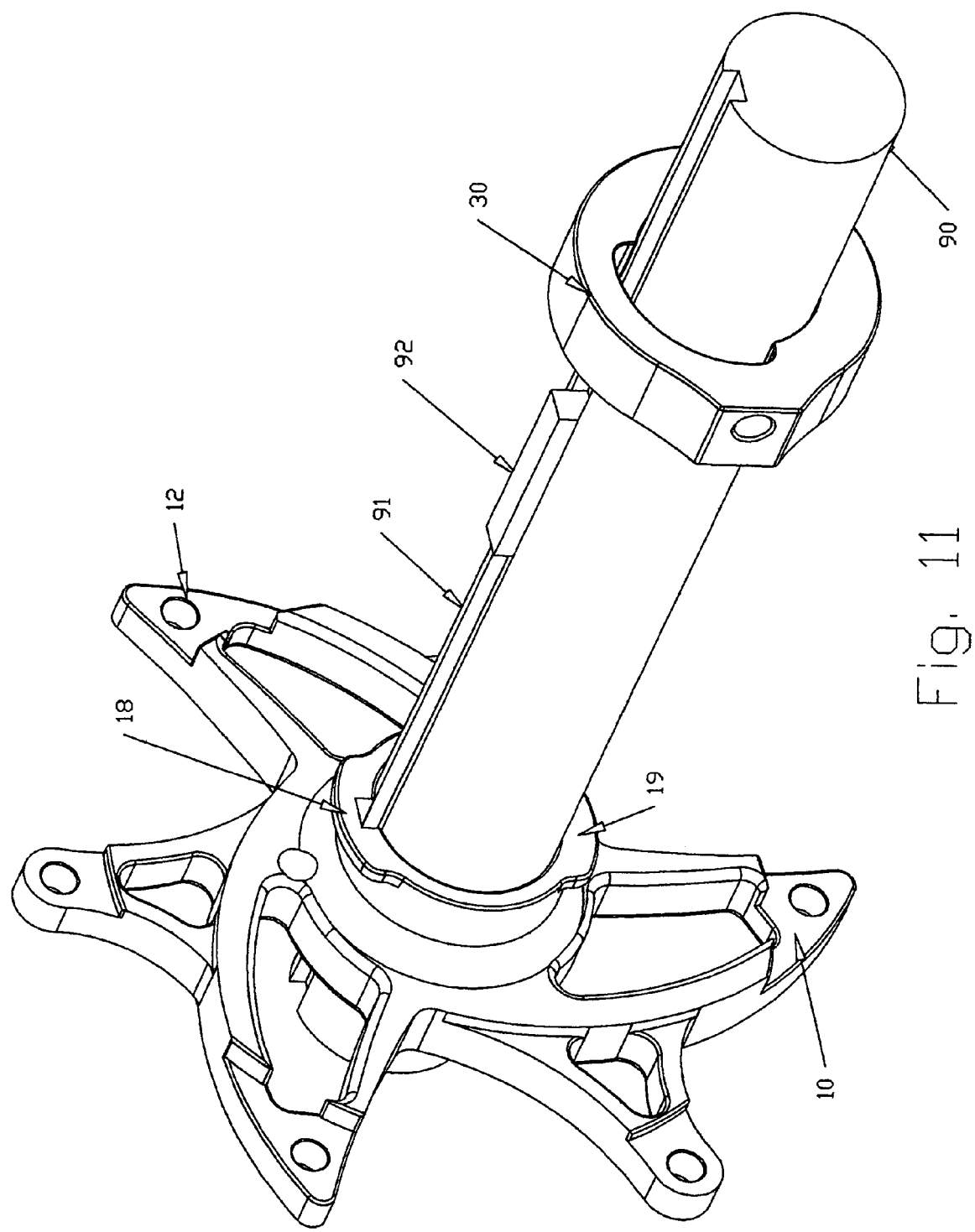
FIG. 11 illustrates another perspective view of the sprocket hub and locking collar, situated on the driving axle in a spaced apart position.
Figure 12:
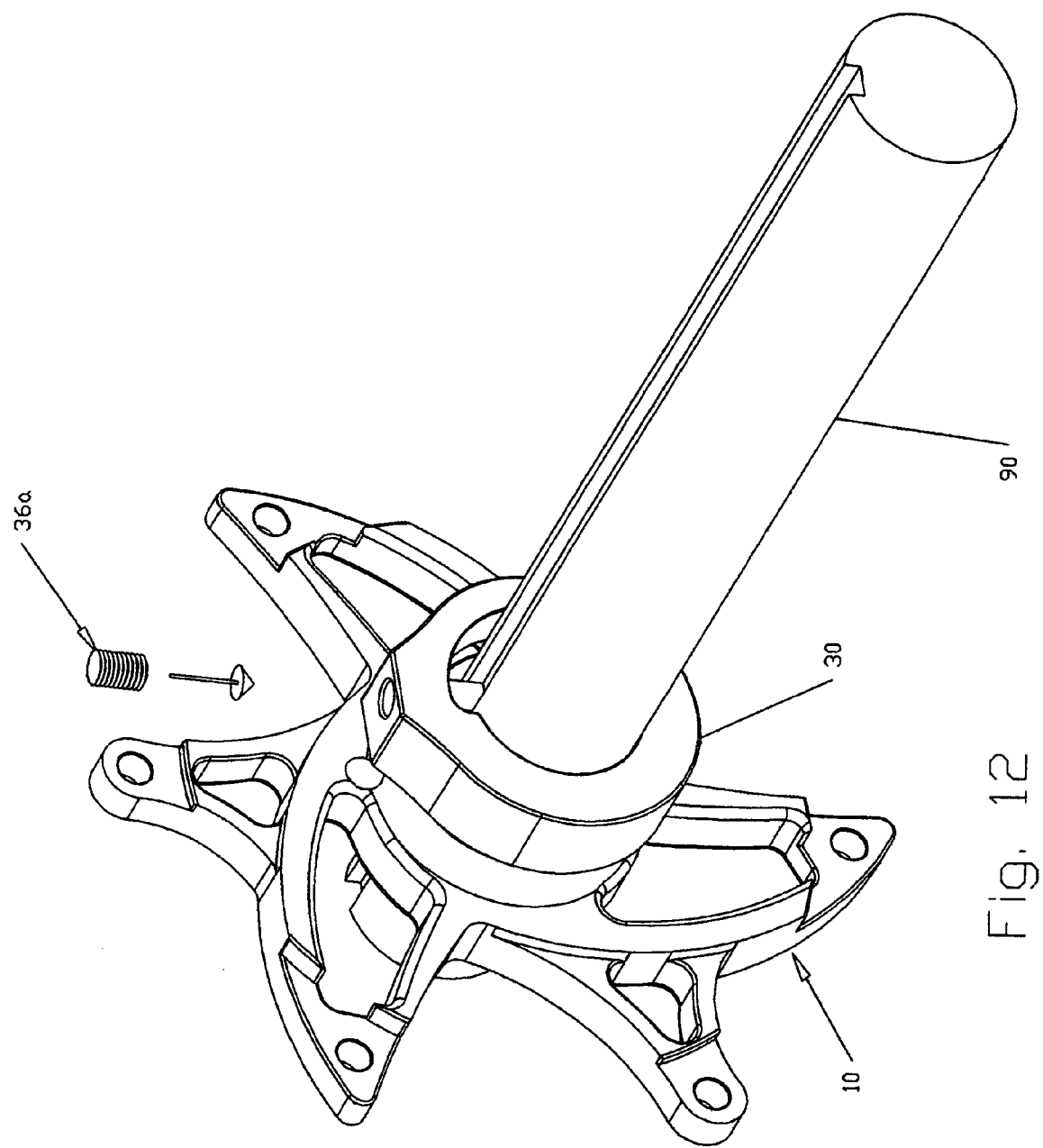
FIG. 12 illustrates another perspective view of the sprocket hub and locking collar, situated in an engaged position.

The sprocket hub 10 includes a hub neck portion 16 which extends outwardly from the hub front face 24 in a direction opposite from the hub rear face 23. The hub neck portion 16 is generally radial and has an outer perimeter and an inner perimeter as shown in FIGS. 1, 10 and 11. The bar slot 25 extends the length of the hub neck 16 and therefore interrupts the radial shape of the hub neck portion 16. The hub neck portion's inner perimeter defines an axial opening 21. The diameter of this axial opening 21 is slightly larger than the diameter of the drive axle 90 to allow the sprocket hub 10 to float and oscillate on the drive axle and to compensate for chassis flex and chain bind.

The floating and oscillation of the present invention is generally accomplished by the sprocket hub 10 and bar notch 25 having a loose fit with the drive axle 90 and bar 92. Floating in particular is caused by a loose fit between the sprocket hub 10, bar notch 25 and locking collar 30 with respect to the drive axle 90 and bar 92. Oscillation in particular is the horizontal pivotal movement of the sprocket hub 10 about the drive axle 90. This oscillation is caused by the sprocket hub 10 and bar notch 25 having a loose fit with the drive axle 90 and bar 92.

The hub neck portion 16 further comprises a neck top flange 18 and a neck bottom flange 19 both located on the end of the hub neck portion 16 opposite from the hub front face 24. Both the neck top flange 18 and the neck bottom flange 19 have an arc distance d1 in length, where d1 is equal to approximately 1.00 inches in this example. The outer perimeter 20 of the hub neck portion 16 defines the outer extent of the hub neck portion 16 in a direction parallel to the longitudinal axis of the axle opening 21.

The locking collar 30 is generally a circular member with an outer perimeter 40, a middle perimeter 33 and an inner perimeter 32. Extending outwardly from the outer perimeter 40 in a direction perpendicular to the longitudinal axis of the axle opening 53 is a raised portion 41, which houses the collar bore 34, the compression screw hole 36 and compression screw 36a.

The collar bore 34 is a threaded hole cut in the locking collar rear face 50 penetrating towards but not through the locking collar front face 51. To give the sprocket hub 10 a more rigid structure, an optional stabilizing screw can be inserted into the screw hole 22 on the hub rear face 23, and pass through the width of the sprocket hub 10, travel along the hub neck portion 16 and thread into the collar bore 34 of the locking collar 30 when assembled. The stabilizing screw and collar bore 34 are both optional.

The compression screw hole 36 accepts the compression screw 36a. Compression screw 36a is used to fasten the locking collar 30 to the bar 92 in order to lock the locking collar 30 to the sprocket hub 10.

The locking collar front face 51 has a bar notch 52 defined on the inner perimeter 32 and extending towards the outer perimeter 40. The bar notch 52 loosely accepts the axle groove bar 92 during locking collar 30 attachment to the sprocket hub 10. The middle perimeter 33 cannot be seen when viewing the locking collar 30 from the locking collar front face 51.

As shown in FIG. 6, the locking collar rear face 50 exposes the outer perimeter 40, the middle perimeter 33 and the inner perimeter 32. The middle perimeter 33 is located between the outer perimeter 40 and the inner perimeter 32 but is proximate to the horizontal plane of the locking collar rear face 50.

The middle perimeter 33 has two curved, elongated middle perimeter lips 39 extending from the middle perimeter 33 inwardly towards the axle opening 53. The middle perimeter lips 39 extend parallel with the plane of the locking collar rear face 50. The middle perimeter lips 39 define two female portions 37 around the middle perimeter 33, each of which have a length of d2, which, in this example, d2 is equal to approximately 1.01 inches.

Located between the locking collar rear face 50 and the locking collar front face 51 is an intermediate surface 54. The intermediate surface 54 is parallel with the plane of the locking collar rear face 50. There is a flange groove 38 defined between the middle perimeter lips 39 and the intermediate surface 54. This flange groove 38 is spaced such that the neck top flange 18 and the neck bottom flange 19 can fit within the flange grove 38 during attachment of the locking collar 30 to the sprocket hub 10, see FIG. 10.

Figure 8:
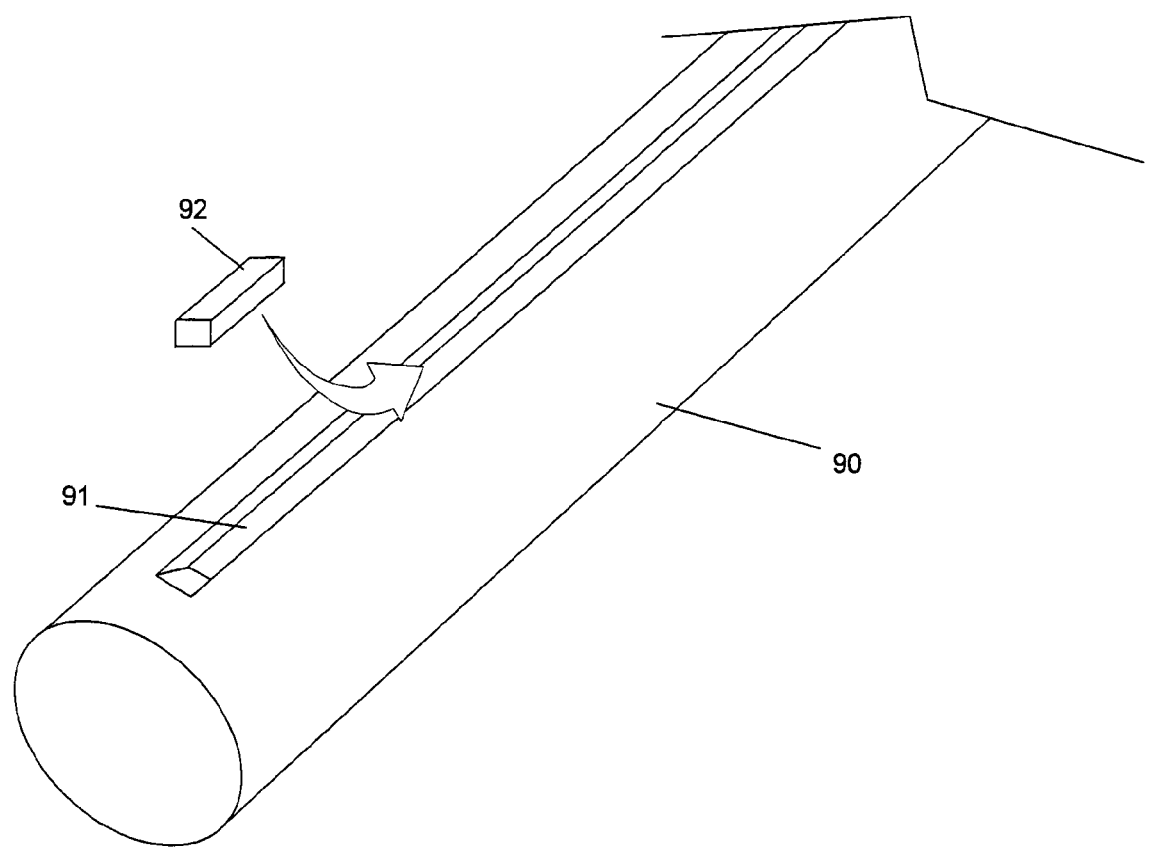
FIG. 8 illustrates a perspective view of the driving axle and axle groove bar on which the sprocket hub and locking collar are positioned.

When attaching the sprocket hub 10 and locking collar 30 to the driving axle 90, the axle groove bar 92 is first placed into the axle groove 91 of the driving axle 90, as shown in FIGS. 8 and 11. Then the sprocket hub 10 is slid over the driving axle 90 through the axle opening 21, as shown in FIGS. 9-12. The sprocket hub 10 fits loosely over the drive axle 90 in order to allow the sprocket hub 10 to float and oscillate on the drive axle 90 to accommodate for chassis flex and chain bind. This floating and oscillation of the sprocket hub 10 on the drive axle 90 allows for enhanced acceleration of a go kart vehicle. The floating and oscillation of the sprocket hub 10 also helps reduce excessive wear on the hub sprocket hub 10, the gear sprocket and the drive chain.

Another benefit of the float and oscillation design is the alignment compensation when "lead" or "wedge" is set into the rear axle of the go kart vehicle. Lead is when the axle is cocked to allow the rear of the go kart vehicle to travel sideways (fractionally). Wedge is when the axle is cocked to increase the force on either the right or left tire. Both wedge and lead bring the clutch and sprocket hub 10 out of alignment. The float and oscillating design of the sprocket hub 10 helps to compensate for this misalignment.

Figure 9:
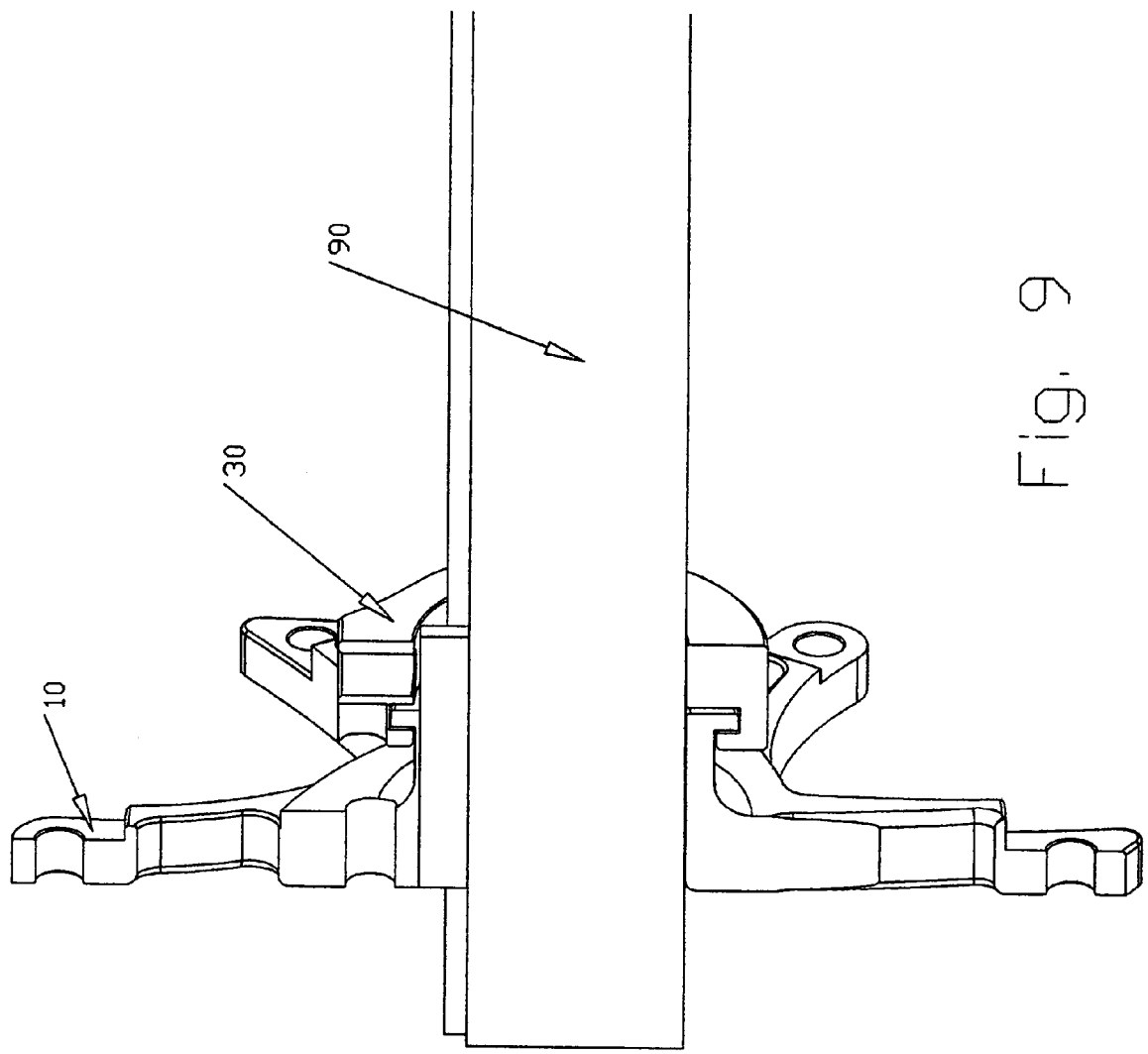
FIG. 9 illustrates a cut away view of the sprocket hub and locking collar situated on the driving axle in an engaged position.

The sprocket hub 10 should be positioned over the axle groove bar 92 so that the bar slot 25 engages the axle groove bar 92, see FIG. 9. The hub neck portion 16 can face either direction when placed upon the driving axle 90, as long as it can engage the locking collar rear face 50. The locking collar 30 is then slid onto the axle through axle opening 53. The locking collar rear face 50 should be facing the sprocket hub front face 24 when both are positioned on the axle. The neck top flange 18 and the neck bottom flange 19 of the hub neck portion 16 should engage the female portions 37 of the locking collar 30 during assembly.

Once the locking collar 30 is generally engaged with the sprocket hub 10 via the neck flanges 18 and 19, the locking collar 30 should be turned in either a clockwise direction or counterclockwise direction until the compression screw hole 36 is aligned above the bar 92. This rotation is shown-with reference to FIGS. 10 and 11, showing the unengaged, unrotated position, and the engaged, rotated position shown in FIG. 12. Upon rotation of the locking collar 30, the top and bottom flange, 18 and 19 respectively, are positioned behind the middle perimeter lips 38, which causes the locking collar 30 to become attached to the sprocket hub 10.

After this alignment is made, the user should ensure that the axle groove bar 92 is engaged with the bar notch 52. The compression screw 36A is then tightened to essentially "lock" the locking collar 30 into place on the sprocket hub 10.

Once the locking collar 30 is fastened to the sprocket hub neck portion 16, an optional stabilizing screw (not shown) may be inserted through the hub rear face 23 via the screw hole 22 and attached to the locking collar rear face 50 via the collar bore 34. The step of utilizing this stabilizing screw adds strength and rigidity to the overall sprocket hub 10 and locking collar 30 assembly. This stabilizing screw is optional, however, as the current assembly can function properly without the use of the stabilizing screw.

Generally the present invention is used, on a go kart vehicle or other vehicle, as follows. The vehicle motor spins the clutch, the clutch spins the drive chain, and then the drive chain spins the gear sprocket. The gear sprocket is attached to the sprocket hub 10 by means of bolts, studs or the like. The sprocket hub 10 is attached to the driving axle 90 by means of the axle groove bar 92 and to the locking collar 30 via the compression screw 36A. This attachment causes the gear sprocket and sprocket hub 10 to rotate in unison with the driving axle 90, which in turn drives the wheels of the vehicle.

We claim:

1. A sprocket hub and locking collar apparatus, comprising:
   a sprocket hub having a front face and a rear face;
   a radial neck portion having an inner and outer perimeter, said neck portion extending outwardly from said front face of said sprocket hub, wherein said inner perimeter of said neck portion defines an axial opening to permit said sprocket hub to slide over a drive axle;
   said neck portion having a top and bottom flange both located on the outer perimeter of said neck portion distal to said sprocket hub front face;
   a locking collar having a front face, a rear face, a middle perimeter and an inner middle perimeter;
   said middle perimeter is interrupted by two elongated middle perimeter lips which define two middle perimeter female portions; and,
   said inner perimeter of said locking collar defines an axial opening capable of permitting said locking collar to slide over said drive axle and engage said radial neck portion;
   whereby upon rotation said locking collar can be fixed to said sprocket hub on said drive axle.

2. The sprocket hub and locking collar apparatus of claim 1, wherein said sprocket hub further comprises a plurality of hub arms attached to the outer perimeter of said neck portion.

3. The sprocket hub and locking collar apparatus of claim 2, wherein said sprocket hub further comprises connection holes located on said hub arms for connection of the sprocket hub to a gear sprocket.

4. The sprocket hub and locking collar apparatus of claim 1, further comprising a bar slot defined within said inner perimeter of said neck portion, said bar slot is adapted to accept a bar.

5. The sprocket hub and locking collar apparatus of claim 1, wherein a screw hole is defined through said sprocket hub proximal to said top flange of said neck portion, said screw hole is adapted to accept a stabilizing screw.

6. The sprocket hub and locking collar apparatus of claim 1, wherein said locking collar further comprises a raised portion, said raised portion houses a collar bore, a compression screw hole and a compression screw.

7. The sprocket hub and locking collar apparatus of claim 1, wherein a bar notch is defined within the inner perimeter of said locking collar.

8. A sprocket hub and locking collar apparatus, comprising:
   a sprocket hub having a front face and a rear face;
   a radial neck portion having an inner and outer perimeter, said neck portion extending outwardly from said front face of said sprocket hub, wherein said inner perimeter of said neck portion defines an axial opening to permit said sprocket hub to slide over a drive axle;
   said neck portion further comprising a top and bottom flange both located on the outer perimeter of said neck portion distal to said sprocket hub front face;
   a bar slot is defined within said inner perimeter of said neck portion, said bar slot is adapted to accept a bar portion;
   a locking collar having a front face, a rear face, a middle perimeter and an inner middle perimeter;
   said middle perimeter is interrupted by two elongated middle perimeter lips which define two middle perimeter female portions;
   a bar notch is defined within the inner perimeter of said locking collar;

said inner perimeter of said locking collar defines an axial opening capable of permitting said locking collar to slide over said drive axle and engage said radial neck portion; and, whereby upon rotation said locking collar can be fixed to said sprocket hub on said drive axle.

9. The sprocket hub and locking collar apparatus of claim 8, wherein said sprocket hub further comprises a plurality of hub arms attached to said neck portion.

10. The sprocket hub and locking collar apparatus of claim 9, said sprocket hub further comprises connection holes defined within said hub arms for connection of the sprocket hub to a gear sprocket.

11. The sprocket hub and locking collar apparatus of claim 8, wherein a screw hole is defined through said sprocket hub proximal to said top flange, said screw hole is adapted to accept a stabilizing screw.

12. The sprocket hub and locking collar apparatus of claim 8, wherein said locking collar further comprises a raised portion, said raised portion houses a collar bore, a compression screw hole and a compression screw.

13. A sprocket hub apparatus for use on a vehicle, comprising:
    a sprocket hub having a front face and a rear face;
    a radial neck portion having an inner and outer perimeter, said neck portion extending outwardly from said front face of said sprocket hub, wherein said inner perimeter of said neck portion defines an axial opening to permit said sprocket hub to slide over a drive axle;
    a bar slot defined within said inner perimeter;
    a plurality of fin-like hub arms attached to the outer perimeter of said neck portion which extend in a direction perpendicular to a longitudinal axis of said axial opening of said neck portion, said fin-like hub arms having recesses defined therein; and,
    a hub arm extension attached to each of said fin-like hub arms, each said hub arm extension having a small recess defined therein.

14. The sprocket hub apparatus of claim 13, wherein said fin-like hub arms have sprocket connection holes defined therethough for connection to a gear sprocket.

15. The sprocket hub apparatus of claim 13, wherein each said hub arm extension has a sprocket connection hole defined therethrough for connection to a gear sprocket.

16. The sprocket hub apparatus of claim 13, wherein said neck portion further comprises a top and bottom flange both located on the outer perimeter of said neck portion distal to said sprocket hub front face.

* * * * *